(12) United States Patent
Kulas

(10) Patent No.: US 7,091,926 B2
(45) Date of Patent: Aug. 15, 2006

(54) COMPUTER DISPLAY SYSTEM USING MULTIPLE SCREENS

(76) Inventor: Charles J. Kulas, 244 Texas St., San Francisco, CA (US) 94107

( * ) Notice: Subject to any disclaimer, the term of this patent is extended or adjusted under 35 U.S.C. 154(b) by 297 days.

(21) Appl. No.: 10/072,383

(22) Filed: Feb. 8, 2002

(65) Prior Publication Data

US 2003/0151562 A1 Aug. 14, 2003

(51) Int. Cl.
*G09G 5/00* (2006.01)
(52) U.S. Cl. ......................................... 345/1.1; 345/1.3
(58) Field of Classification Search ................. 345/1.1, 345/1.2, 1.3, 2.1, 2.2, 2.3, 4, 419, 629, 3.1, 345/3.4, 632, 748, 753, 552, 565, 158, 619, 345/649, 653, 664, 679, 761, 767; 434/29, 434/44; 340/119, 705; 348/383, 840
See application file for complete search history.

(56) References Cited

U.S. PATENT DOCUMENTS

| | | | | |
|---|---|---|---|---|
| 4,740,779 A | * | 4/1988 | Cleary et al. ................... | 345/7 |
| 5,275,565 A | * | 1/1994 | Moncrief ...................... | 434/29 |
| 5,361,078 A | * | 11/1994 | Caine .......................... | 345/1.3 |
| 5,367,614 A | * | 11/1994 | Bisey .......................... | 345/419 |
| 6,020,890 A | * | 2/2000 | Kohda ......................... | 345/419 |
| 6,190,172 B1 | * | 2/2001 | Lechner ....................... | 434/44 |
| 6,232,932 B1 | * | 5/2001 | Thorner ....................... | 345/1.3 |
| 6,501,441 B1 | * | 12/2002 | Ludtke et al. ................ | 345/1.1 |
| 6,570,546 B1 | * | 5/2003 | Welker et al. ................ | 345/1.1 |
| 6,661,425 B1 | * | 12/2003 | Hiroaki ....................... | 345/629 |
| 2002/0140628 A1 | * | 10/2002 | Morrone ...................... | 345/1.1 |
| 2003/0043087 A1 | * | 3/2003 | Kim ............................ | 345/1.1 |

OTHER PUBLICATIONS

"This Month: Don Lindsay's Mars Lander," Maximum PC, May 2002, p. 96.

* cited by examiner

*Primary Examiner*—Bipin Shalwala
*Assistant Examiner*—Nitin Patel

(57) ABSTRACT

The present invention allows a user to arbitrarily position display screens so that a larger field of view can be presented by a computer system that senses the screen positions and provides appropriate display information. This is in contrast to the typical use of display screens where a single display screen is used and the position of the display screen is assumed to be directly in front of a user's viewpoint. For example, two screens can be placed side-by-side so that their viewing surfaces together form a rectangular plane. This can be useful for viewing movies or other presentations that benefit from a larger horizontal viewing field. More complex arrangements of multiple screens can be set up for more immersive presentations such as virtual reality, simulations, computer games, etc. A mounting bracket for holding screen in a fixed orientation with respect to each other is described. A preferred embodiment of the bracket includes a visual indicator for determining the angle of a screen with respect to another.

16 Claims, 4 Drawing Sheets

COMPUTER DISPLAY SYSTEM USING MULTIPLE SCREENS

BACKGROUND OF THE INVENTION

Typical display screens occupy a relatively small part of a viewer's, or user's, field of view. A standard computer monitor, television screen, liquid crystal, flat panel, thin-film transistor, or other type of display device might measure 14 to 29 inches diagonal. This requires a user to be relatively close to the display in order for the display to fill up a larger portion of the user's field of view.

Larger displays are possible. For example, a projection display can occupy a much larger area. However, such devices are often expensive and inconvenient. For example, a projector might have to be located at some distance from the screen, or other surface, in order to create a sufficiently large display. Another problem with projection type of displays is that they, in effect, "blow up" a high resolution into a coarser resolution. For example, if a 1024×768 display is projected to create a large image, the image is still at the 1024×768 resolution. The picture elements, or pixels, and spaces between pixels are made larger by projecting. Thus, the pixel density is decreased. This is why projected displays are usually viewed from a larger distance than the display screens mentioned above. A longer viewing distance means that the coarser resolution is not as noticeable.

Another approach is a so-called "wall of video". This approach uses multiple display screens usually arranged in a rectangle, or wall. Portions of an image to be displayed are divided among the separate display screens in the wall so that a much larger display can be obtained. Note that this approach maintains the display density since each screen is still displaying at its native density. For example, if three screens are used in a row, and each screen has a 1024×768 density, then although three times as much area is covered by the combination of three display screens, there are also three times as many pixels in the composite display.

A problem with the wall of video approach is that it is inflexible and expensive. The system must be designed from the outset so that an image source can appropriately generate separate video signals to each of the screens. Typically, a computer is used to divide a single input image into separate images for the sections of the wall of video. For example, if a wall of video uses 9 screens in a 3×3 arrangement, then the computer system is designed to divide an original image into an equal 3×3 grid. Each section of the grid is sent to the associated display screen. The arrangement is hardwired and is typically designed on a customized, per installation, basis. Setting up such a display requires planning of the area to be covered, size and number of screens to use, multiple display output hardware devices, custom software to divide the input images, etc.

Once a wall of video system is set up it is not easily changed. This makes it difficult to adapt the display to different applications. For example, viewing a movie may require that the screens be arranged in a 4:3 aspect ratio for best viewing. Presenting documents or tables of information might best be achieved if an overall display is taller than it is wide. Playing computer games that simulate immersion into a simulated environment warrant a display area that wraps around a user and that can potentially cover large spherical sections around the user.

Thus, it is desirable to provide a multi-screen display system that improves upon one or more of the shortcomings of the prior art.

SUMMARY OF THE INVENTION

The present invention allows a user to arbitrarily position display screens so that a larger field of view can be presented by a computer system that senses the screen positions and provides appropriate display information. This is in contrast to the typical use of display screens where a single display screen is used and the position of the display screen is assumed to be directly in front of a user's viewpoint. For example, two screens can be placed side-by-side so that their viewing surfaces together form a rectangular plane. This can be useful for viewing movies or other presentations that benefit from a larger horizontal viewing field. More complex arrangements of multiple screens can be set up for more immersive presentations such as virtual reality, simulations, computer games, etc.

A mounting bracket for holding screen in a fixed orientation with respect to each other is described. A preferred embodiment of the bracket includes a visual indicator for determining the angle of a screen with respect to another.

In one embodiment the invention provides a method for generating display information including determining the positions of multiple display screens and generating display information for the display screens by using the determined positions so that different portions of a single scene are displayed upon multiple display screens at the same time to provide a coherent view of the scene from at least one viewpoint.

In another embodiment the invention provides a method for using multiple display screens in a presentation, comprising first sensing the positions of a plurality of display screens at a first time; providing the first sensed positions to a digital processor for rendering views for the plurality of display screens in accordance with the first sensed positions; sensing the positions of the plurality of display screens at a second time; and providing the second sensed positions to a digital processor for rendering views for the plurality of display screens in accordance with the second sensed positions.

In another embodiment the invention provides a method for using multiple display screens in a computer-generated presentation, comprising indicating to a human user preferred positions for two or more display screens; and rendering views for the two or more display screens in accordance with the preferred positions.

In another embodiment the invention provides a bracket for joining two or more display screens, the bracket comprising a first slot for receiving a first display screen; and a second slot coupled to the first slot for receiving a second display screen.

DETAILED DESCRIPTION OF A PREFERRED EMBODIMENT

The present invention allows a user to arbitrarily position display screens so that a larger field of view can be presented by a computer system that senses the screen positions and provides appropriate display information. This is in contrast to the typical use of display screens where a single display screen is used and the position of the display screen is assumed to be directly in front of a user's viewpoint. For example, two screens can be placed side-by-side so that their viewing surfaces together form a rectangular plane. This can be useful for viewing movies or other presentations that benefit from a larger horizontal viewing field. More complex arrangements of multiple screens can be set up for more presentations such as virtual reality simulations, computer games, etc.

Figure 1A:
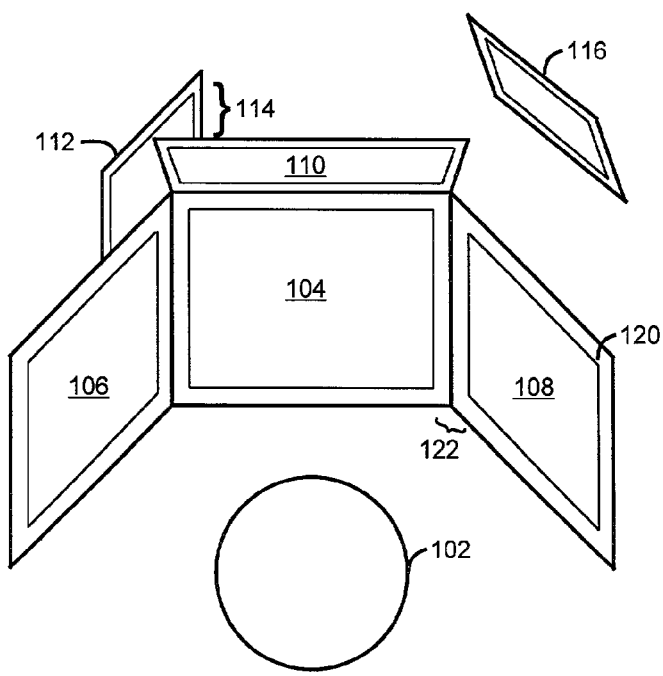
FIG. 1A shows a user viewing multiple screens.

In FIG. 1A, user 102 is in front of main screen 104. Screens 106 and 108 are placed adjacent to main screen 104 to the left and right sides, respectively. Screen 110 is above main screen 104 and is angled towards the user. Augmenting screens 112 and 116 are positioned behind and above the screens already mentioned.

Screens such as 112 may include obscured screen areas such as at 114 if screens overlap. Obscured areas can be calculated by a program or programs that are used to calculate, render, generate or otherwise present a visual scene, or presentation, on the multiple display screens. In other words, since presentation software is informed of the positions of the display screens, the software can determine that the area at 114 of display screen 112 can not be seen by a user at 102. In this case the software can omit calculation for, and transfer of, viewing information to screen 112.

In FIG. 1A, screens are shown with borders such as border 120 on screen 108. Borders are portions of a display enclosure that are not used to present information. Borders are not desirable for multiple screen presentation because they detract from an integrated, or coherent, presentation by introducing "blind spots." When two screens with borders are placed adjacently the border size grows as shown at 122 of FIG. 1A. In a preferred embodiment, the border size, shape and other characteristics (if any) are conveyed to presentation software (i.e., software producing the images to be viewed by a user) so that they can be taken into account in determining the exact size, shape, position and orientation of display screens. Borders can be specified explicitly or implicitly. Explicit specification of borders includes a description of borders such as their size and orientation. Implicit specification of borders assumes that borders exist and are of a known, or assumed, size and orientation with respect to detected or indicated screen positions.

For example, if a user specifies display positions (not including border positions) then the border positions can be inferred as the spaces between the display screens. In this case no special accommodating of the borders is required. The presentation software merely counts the border areas as "blank space" that does not have screen coverage. If specifications are made for the positions of screens and borders as a unit, as where monitor screens are indicated coarsely by stating adjacencies of units and sizes of screens, then border sizes can be obtained or assumed in varying ways. One way is to have a database of display screen types and provide for detection of display screen types and matching to the database which provides corresponding border sizes. Or a typical border of, e.g., 1.5 inches can be assumed. Or a user can indicate the presence of borders to the presentation software.

Note that screens can be placed arbitrarily and anywhere. Display screen 116 has been placed somewhat far behind and above the other display screens. In such a case, there may be a large amount of "blank space" or blank area between the screens. In a preferred embodiment, the presentation software (e.g., a graphics program for rendering a scene) only generates the portion of the scene that is appropriate for each display screen area based on the display screen's position and user viewpoint. The number, type, size or other characteristics of the display screens can vary from those discussed herein.

Figure 1B:
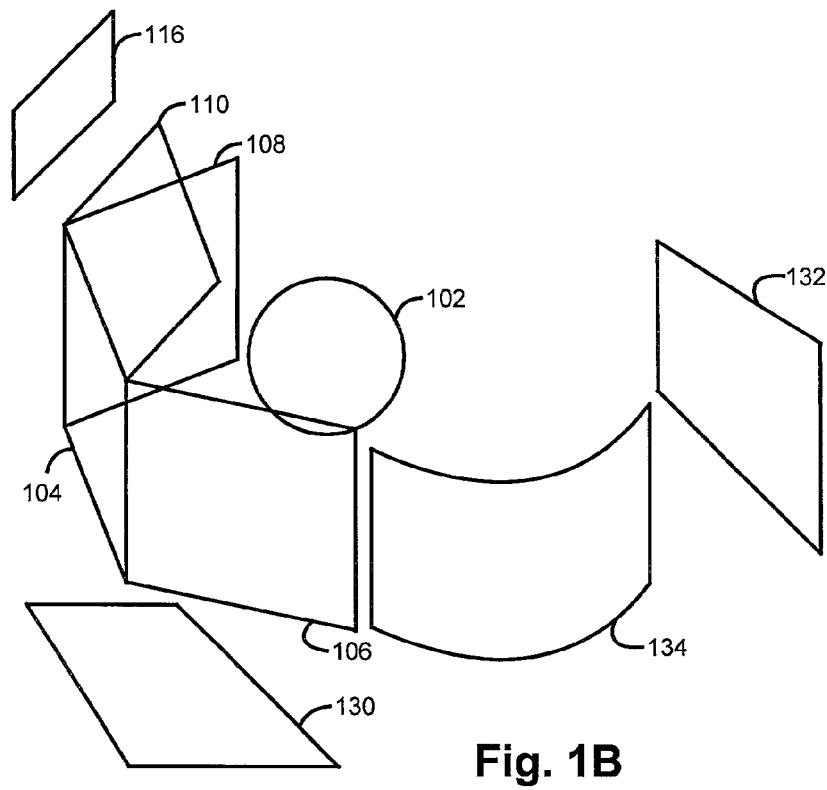
FIG. 1B is a left-side, perspective view that includes some of the screens shown in FIG. 1A.

FIG. 1B illustrates further aspects of display screen positioning.

In FIG. 1B, display screens are shown as wire frames without borders for simplification and clarity. FIG. 1B is a left-side, perspective view that includes some of the screens shown in FIG. 1A. In FIG. 1B, user 102 faces main screen 104, side screens 106 and 108, and top screen 110, as in FIG. 1A. Displaced screen 116 is also shown. Additional screens show the flexibility of the system by permitting floor screen 130, rear screen 132 and wraparound screen 134. Such a configuration may be useful in immersive environments where the effect of the presentation is enhanced by providing images to a user's peripheral vision, or by allowing a user to look around at the different display screens while still presented with relevant, coherent visual information.

As used in this application, "coherent" presentation of visual information includes presentation on two or more display devices where there is a perceived aesthetic consistency, or relationship, of the visual information on the different display devices. For example, a single scene that is rendered across the multiple display devices at the same time fits this description. Another example, is movement from one screen to another consistent with a simulation, depiction or portrayal of natural, or physical, movement. An example of natural movement is a person walking, car moving, falling object, exploding object, ballistic path, etc.

Screen positions can be predetermined, designated, or sensed. Sensing can include using remote sensing devices such as acoustic, radio-frequency, infrared, etc. For example, a user can indicate three points of a screen's perimeter by placing an infrared emitter on each of the points. A computer system is informed of each point by, e.g., a user keypress at or near the time of emitter placing. Once three points, such as three corners of a display screen, are known, the three-dimensional position of the screen, along with the screen dimensions, can be determined.

Three dimensional sensing can be by any means as is known in the art. For example, laser scanning, coordinate measuring machines, etc. can be used along with triangulation techniques to identify positions. Another approach is to use global positioning system (GPS) sensing. Other alternatives include angulation using phased antenna arrays, imaging using one or multiple cameras and scene analysis, etc.

Another type of sensing is mechanical sensing. This can use a movable arm located at a known point where the end of the arm is touched (or moved near) to one or more points of a screen. Joints or hinges can be affixed at places where screens are adjacent. Such joints can measure the angles made by the planes of the adjacent screens so that positions of secondary screens relative to a main screen can be determined. This is usually sufficient to determine accurate positions of the secondary screens. Sizes of the screens can be manually input by the user so that presentation software can compute only the views, and viewport sizes, necessary to create information to be displayed on each of the screens. Such sensing joints can be made strong enough to hold and support multiple screens. An example of such a joint is described, below.

One useful way to determine positions of screens is simply to ask a user to input the positions. This manual position designating includes having a user make measurements of distances and angles which are then entered into a computer system that calculates the screen positions from the measurements. The user measurements can be rough approximations and screen positions can still be determined with enough accuracy to create a coherent multi-screen display.

Screen positions can be calibrated. One form of calibration allows a user to move models of screens on a computer display. Each screen model corresponds to an actual screen that the user is viewing. The model positions are used to generate views for the screens as the user is moving a model. When the user sees matching views of a scene, test pattern, reference object, etc., among screens that include the model screen being moved, then calibration is achieved. The user indicates to a computer system that the current model position results in a view that is coherent with another screen (e.g., the main screen) and the computer system can then use the information to generate further views for the screen corresponding to the model.

Screen positions can be predetermined. For example, a presentation program may have default, or optimal, screen placements determined by a program, or presentation, author. In this case, the user is directed to place the screens in a predetermined orientation. It is possible that an automated system can move the screens without user intervention. For example, screens can be on pivoting platforms, moveable robotic arms, etc.

Figure 2A:
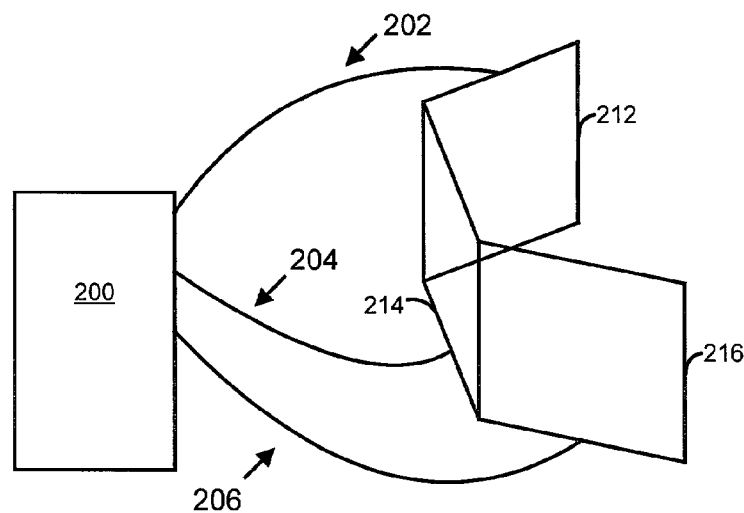
FIG. 2A is a first illustration of a processing system in communication with multiple display screens.
Figure 2B:
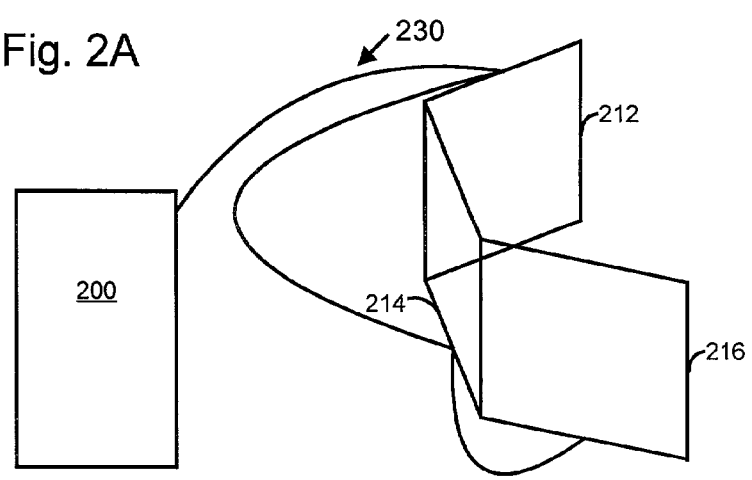
FIG. 2B is a second illustration of a processing system in communication with multiple display screens.
Figure 2C:
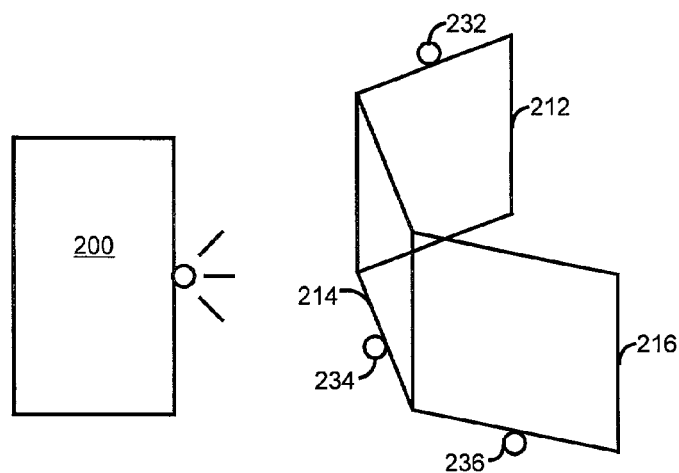
FIG. 2C is a third illustration of a processing system in communication with multiple display screens.

FIGS. 2A–C illustrate different modes of information transfer to multiple display screens.

In FIG. 2A, computer system 200 includes 3 outputs 202, 204 and 206, that feed screens 212, 214 and 216, respectively. Thus, the computer generates a separate output for each display screen. The outputs can be digital, composite or component video or any other type of format. Typically, a computer uses a graphics card that provides the image output. The computer can use multiple graphics cards or a single graphics card can provide one or more outputs. Other approaches to generating the output signals are possible.

FIG. 2B shows computer 200 using single output line 230 to feed information to all three screens 212, 214 and 216. In this case, each screen is "daisy chained" to the next screen. Each screen takes only the information appropriate for the particular screen. Many approaches can be used such as using a digital network (e.g., Universal Synchronous Bus (USB), IEEE 1394, Ethernet, etc.) for the output line. Identifiers can be used to designate packets (or other portions of the signals) for a particular screen. In general, any communications method can be used to transfer information from a computer executing a presentation program to the multiple display screens.

FIG. 2C illustrates wireless transfer of information from computer 200 to display screens 212, 214 and 216. Transmitter 240 sends signals (e.g., infrared, acoustic, radio frequency or other electromagnetic signals, etc.) to display screens 212, 214 and 216 that are equipped with receivers 232, 234 and 236, respectively.

Figure 3B:
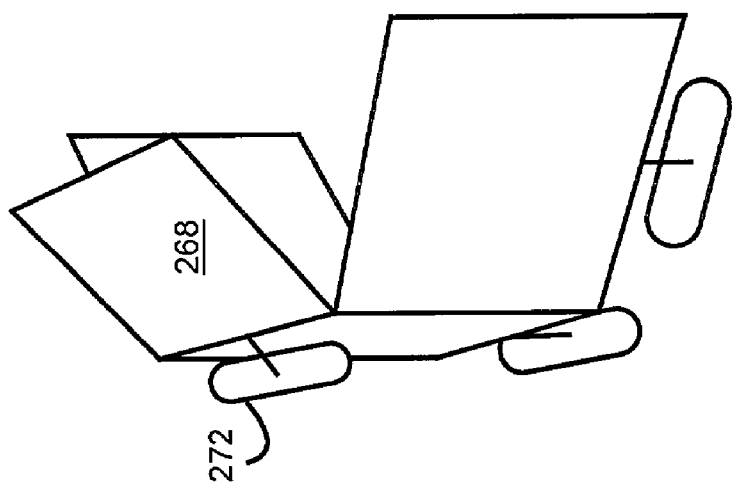
FIG. 3B is a second illustration to show use of mounting brackets for positioning a four-screen display.
Figure 3A:
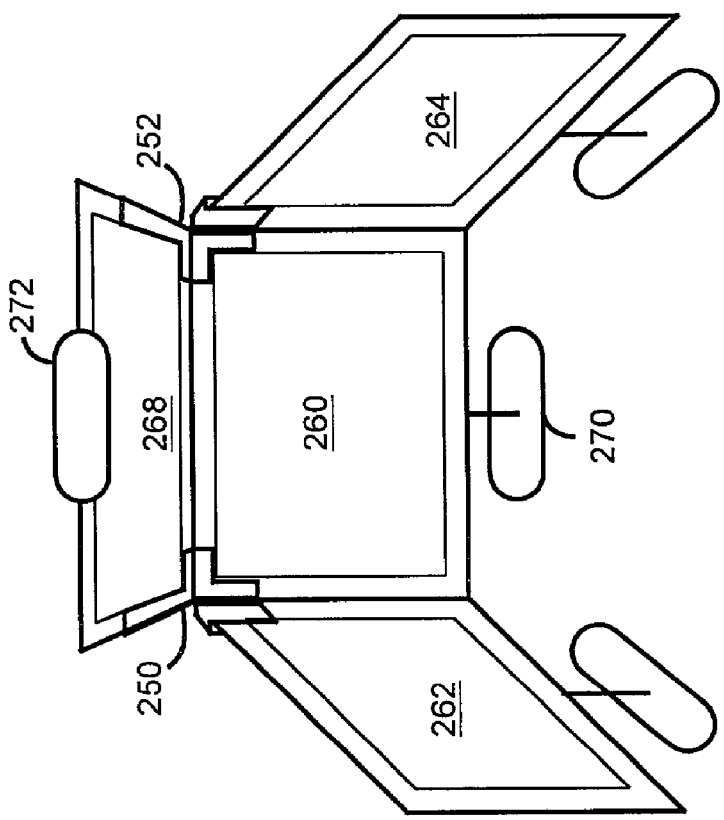
FIG. 3A is a first illustration to show use of mounting brackets for positioning a four-screen display.

FIGS. 3A–B illustrate the use of mounting brackets for positioning a four-screen "hood" display.

In FIG. 3A, four screens are held in place with two mounting brackets. Left mounting bracket 250 attaches to screens 260, 262 and 268. Right mounting bracket 252 attaches to screens 260, 264 and 268. The user viewpoint is as depicted for a viewer of FIG. 3A.

Each bracket has three U-shaped slots for holding an edge of a screen. The slots can be tilted, or movably positioned, so that the screens can form different angles in accordance with a user's preference for a specific set of screen orientations. In a preferred embodiment a general configuration is maintained where main screen 260 has left and right screens 262 and 264; along with top screen 268. Details of the brackets are discussed in more detail, below.

Each screen has a stand. In FIG. 3A, screen 260 is shown with stand 270 while screen 268 is shown with stand 272. Note that screen 268 is upside down so that stand 272 is pointing towards the viewer. In a preferred embodiment, the system can flip a screen's image information so that an upside-down screen still displays a rightside-up image. In general, the system of the present invention can accommodate screens positioned at offset rotational angles such as sideways, or any degree of tilt.

An alternative arrangement for screens is shown in FIG. 3B. FIG. 3B shows a left-side view of the hood configuration of FIG. 3A. In FIG. 3B, top screen 268 is now rightside-up so that stand 272 is pointed away from a viewer. Some screens in multiple screen arrangements may be more easily positioned if there is not a stand. However, many of today's flat panel displays have stands that are not removable, or positionable, to accommodate desired screen arrangements. Most likely the use of stands for the main, left and right screens is desirable.

Figure 4C:
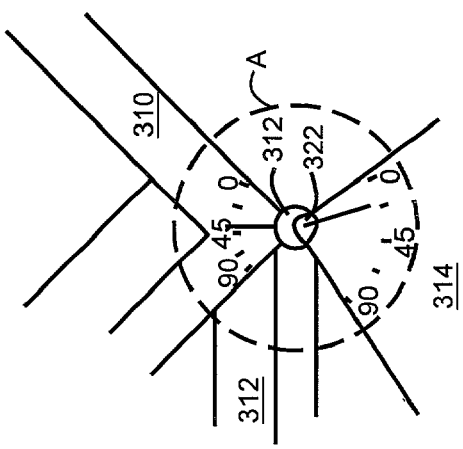
FIG. 4C illustrates the alignment pointer feature of a bracket.
Figure 4B:
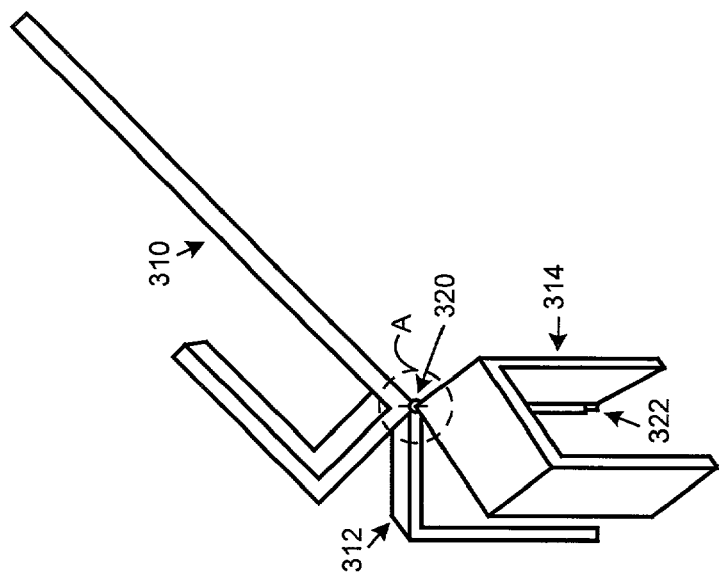
FIG. 4B is a larger, perspective view of one of the brackets of FIG. 4A.
Figure 4A:
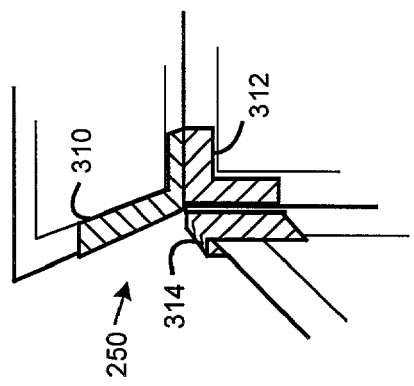
FIG. 4A shows a bracket used to hold screen displays.

FIGS. 4A–C illustrate details of a mounting bracket for achieving a hood configuration of 4 screens.

In FIG. 4A, bracket 250 of FIG. 3A is shown shaded so that its geometry can be more easily seen. Other bracket 252 is not shown but, as discussed, operates analogously to bracket 250. The brackets are used to hold four screens together in a movably fixed orientation. The top screen can be tilted up or down. The left and right screens can be angled inward or outward with respect to the main screen. The brackets provide enough stiffness in their joints, or hinges, so that a user can manually move the screens to a position and the position will be thereafter maintained.

Note that the screens of FIG. 4A include borders. The border area is used as a region for providing width to the slots of the brackets. When screens have borders the material used to make the slots can be opaque since none of the screens' viewing area is obscured. Alternatively, slots can be made transparent where they overlap, or otherwise obscure, screen display areas. For example, where there is no screen border the slots should be transparent.

FIG. 4B shows a close-up of bracket 250 of FIGS. 2A and 3A.

In FIG. 4B, three slots 310, 312 and 314 make up the bracket, corresponding to top, main and left slots. Bracket 302 is a mirror image of bracket 300 so that the top, main and right screens are accommodated. Slots 310 and 312 are joined by hinge 320 which is viewed from its end in FIG. 4B. Slots 312 and 314 are joined by hinge 322 which is viewed lengthwise. Each slot is U-shaped for receiving a display screen's edge (as shown in FIG. 4A). Naturally, slots can be made to be different shapes. Any manner of shape is possible and different ways of movably coupling the slots will be apparent, as is known in the art.

Slots include two sides, or arms, and a bottom. In a preferred embodiment, a slot's arms are not necessarily the same length. For example, slot 310 has a front arm that is longer than the back arm. This is because the top screen that fits into slot 310 will need more support at its front face due to gravity. Other bracket arrangements can have arms of any configuration, length, size, shape, coloration or other attributes or properties.

FIG. 4C illustrates an enlargement of the circled area, A, of FIG. 4B.

In FIG. 4C, slots 310, 312 and 314 are joined as discussed, above. Hinge 320 joins slots 310 and 312, while hinge 322 a joins slots 312 and 314. In a preferred embodiment pointers are affixed to the hinges, or other parts of a bracket. The portions of the hinges to which the pointers are affixed are also affixed to slot 312, which is the slot for the main screen. In this manner, the pointers can be used to indicate the angles of the top and side screens with respect to the main screen. Angle markings are printed onto slots 310 and 314 so that a human user can more easily determine the angles to which the screens and slots have been adjusted. The angle is then entered into a computer program for use by a presentation program, or other program, to determine the positions of the screens as discussed, above. Other embodiments can use different methods of indicating angles. For example, sensors such as a potentiometer, switches, etc., can be coupled to an input of a computer system to automatically indicate the angles. Any manner of angle measuring mechanism can be employed.

Although the invention has been discussed primarily with respect to computer (or digital processor) presentations, aspects of the invention can be applied to other forms of presentation. For example, optical presentations can be coordinated by sensing the positions of screens according to the invention. Slides, film or other media can be projected onto rear-projection display screens according to the detected screen orientations to achieve a desired result, or goal. The images can be designed to portray a scene. A tray of slide photographs can be selected according to whether the display screen is in an overhead, lateral, or ground position. For an overhead position, e.g., a blue sky, clouds, bird, etc. image is selected for display. Similarly, a horizon, person, grass, roadway, etc., image can be displayed according to position.

Even more basic types of presentations can be employed. For example, where the goal is to illuminate an object with certain colors, intensity, or shading of light, the display screens may be used merely as sources of white or tinted illumination. Thus, the screen positions can be sensed and compared to a desired lighting model that is provided to a computer, or other system. The system can sense the positions and provide each screen with information to create illumination to obtain the desired result. Such an approach is useful, for example, in photography, film or moviemaking where typical lighting sources include key, fill and background lighting. Parameters such as color balance, light temperature, etc. can be used to specify the model for lighting. Sophisticated, controllable, light sources can be substituted for the display screens. Light sources can include incandescent, fluorescent, tungsten, daylight reflectors, plasma screen, electron tubes, LCD, TFT, micromirror or other devices. A "presentation program" can be any type of hardware or software that generates images for viewing on multiple screens.

Naturally, any combination, position or orientation (e.g., rotated, angled, slanted, etc.) of display screens is possible. Also, any type of display device (or light source) can be used including cathode ray tubes (CRTs), flat-panel displays (e.g., liquid crystal displays (LCDs), thin-film transistors (TFTs), etc.), plasma, electrofluorescent, projection, glass, silvered screens, etc. Any shape and size of display can be used including any size of standard rectangular displays, circular, curved, convex, concave, three dimensional (i.e., non-planar), etc.

The presentation program need not display the same resolution on all of the screens. In fact, it is more advantageous to detect where a user is viewing so that the focus point can be rendered in higher resolution while screen areas that the user is not looking at directly can be rendered in lower resolution (or not at all). This approach reduces the processing resources needed by the presentation program and reduces bandwidth needed to transfer viewing information to the screens.

The user's viewing direction or viewpoint can be detected by position sensing, as described above. The user can wear an emitting indicator that assists in automatically detecting the viewing position. For example, the TrackIR™ system from NaturalPoint™ can be used. If it is known, for example, that the user is looking at the main screen then the top and side screens can be rendered in lower resolution. Or regions on the screens, as opposed to the entirety of the screens, can be rendered differently. A rear screen or other screen, or screen portion, not currently visible need not be rendered at all.

Although a specific type of bracket is described, variations can be obtained that are within the scope of the invention. For example, a bracket might use "V-shaped" rather than U-shaped slots. Clamps can be used instead of the slots. A bracket that does not use the rectangular slots of the preferred embodiment can be employed. Different ways of hinging, or movably connecting the slots together can be employed. Instead of two brackets, a single bracket can be formed by joining the brackets along one or more axes. For example, the brackets can be joined horizontally along the adjacency of the main and top screens. It is possible separate brackets can be used so that, instead of three slots joined together, only two slots are joined. In this case, the bracket may be positioned at different areas of the screens. For example, a bracket can be used at the midpoint of each screen adjacency so that, e.g., the main and top screens are held together, the left and main screens, and the right and main screens are each held by a separate bracket.

Many variations of brackets are possible. In general, it is not necessary to have the angle measuring indicator of the preferred embodiment. Brackets need not be moveable but can be manufactured with slots in a fixed, unmoveable position. Or a bracket can allow only a few positions, rather than the continuous positioning that is possible with the brackets discussed, herein.

Thus, the scope of the invention is to be determined solely by the appended claims.

The invention claimed is:

1. A method for generating display information, the method comprising the following steps performed by one or more digital processors:
    determining three-dimensional positions in space of multiple disconnected display screens; and
    generating display information for the display screens by using the determined three-dimensional positions so that different portions of a single scene are displayed upon multiple disconnected display screens at the same time to provide a coherent view of the scene from at least one viewpoint.

2. The method of claim 1, wherein a user input device is coupled to a first digital processor, the method further comprising:
using the first digital processor to receive signals from the user input device to obtain information to, at least in part, describe a three-dimensional position of a display screen.

3. The method of claim 2, wherein the user input device includes a position sensor.

4. The method of claim 2, wherein the user input device includes a numeric input, the method further comprising
accepting signals from the user input device to allow a human user to specify a display screen's position information.

5. The method of claim 1, further comprising
sensing a three-dimensional orientation of a display screen; and
wherein generating display information includes
using the sensed three-dimensional orientation to display at least a portion of the single scene to provide a coherent view.

6. The method of claim 5, wherein the sensing a three-dimensional orientation of a display screen includes
detecting three points of a particular display screen; and
using the detected three points to determine a three-dimensional orientation of the particular display screen.

7. The method of claim 6, wherein a sensor is used to convey information about the three points.

8. The method of claim 7, wherein the sensor includes an infrared emitter.

9. The method of claim 7, wherein the sensor includes an acoustic emitter.

10. The method of claim 7, wherein the sensor includes a radio-frequency emitter.

11. The method of claim 7, wherein a sensor includes a global positioning system.

12. The method of claim 1, further comprising
using a presentation program to receive user input to determine a display screen characteristic.

13. A method for using multiple display screens in a presentation, the method comprising
first sensing three-dimensional positions of a plurality of disconnected display screens at a first time;
providing the first sensed three-dimensional positions to a digital processor for rendering views for the plurality of display screens in accordance with the first sensed three-dimensional positions;
sensing three-dimensional positions of the plurality of disconnected display screens at a second time; and
providing the second sensed three-dimensional positions to a digital processor for rendering views for the plurality of disconnected display screens in accordance with the second sensed three-dimensional positions.

14. The method of claim 13, further comprising
determining a three-dimensional position of a display screen by accepting input from a human user.

15. The method of claim 13, further comprising
automatically sensing the three-dimensional position of a display screen.

16. A method for using multiple disconnected display screens in a computer generated presentation, the method comprising:
indicating to a human user preferred three-dimensional positions for two or more display screens;
rendering views for the two or more display screens in accordance with the preferred three-dimensional positions; and
accepting signals from a user input device to modify a preferred three-dimensional position of at least one of the two or more display screens.

* * * * *